Dec. 20, 1927.　　　　　　　　　　　　　　　　1,653,185
F. C. KUSSE, SR., ET AL
AIRCRAFT
Filed Feb. 5, 1927　　　　　　2 Sheets-Sheet 1
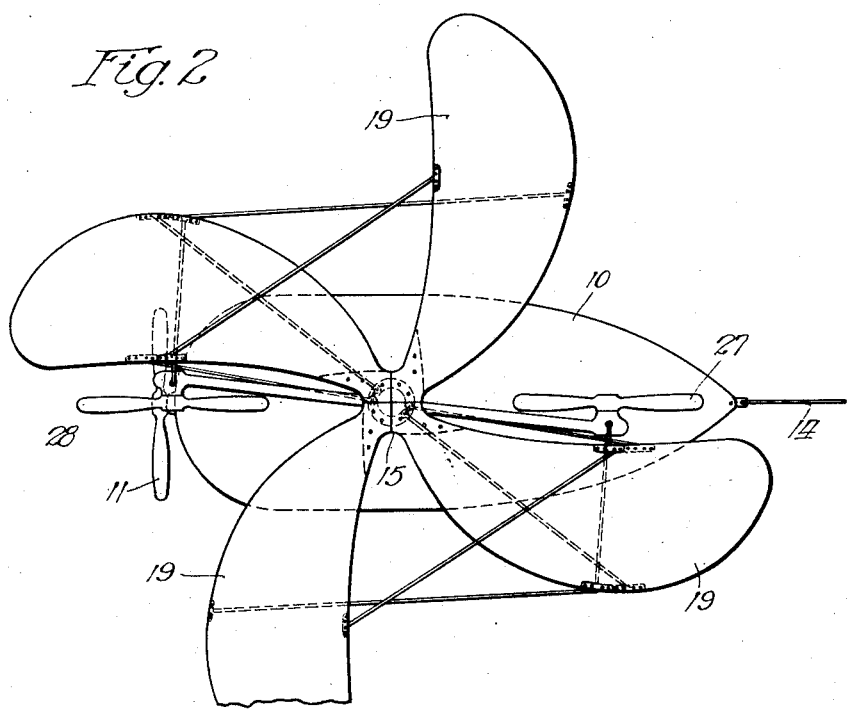
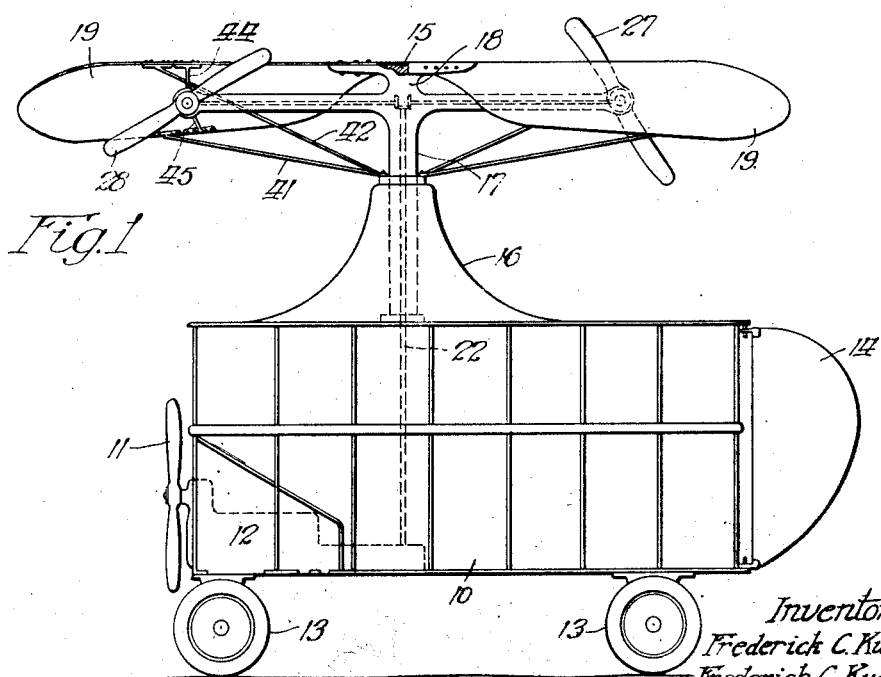

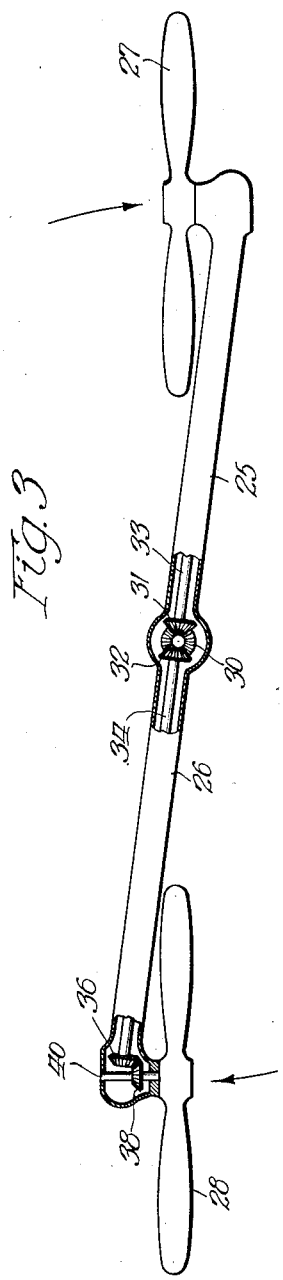
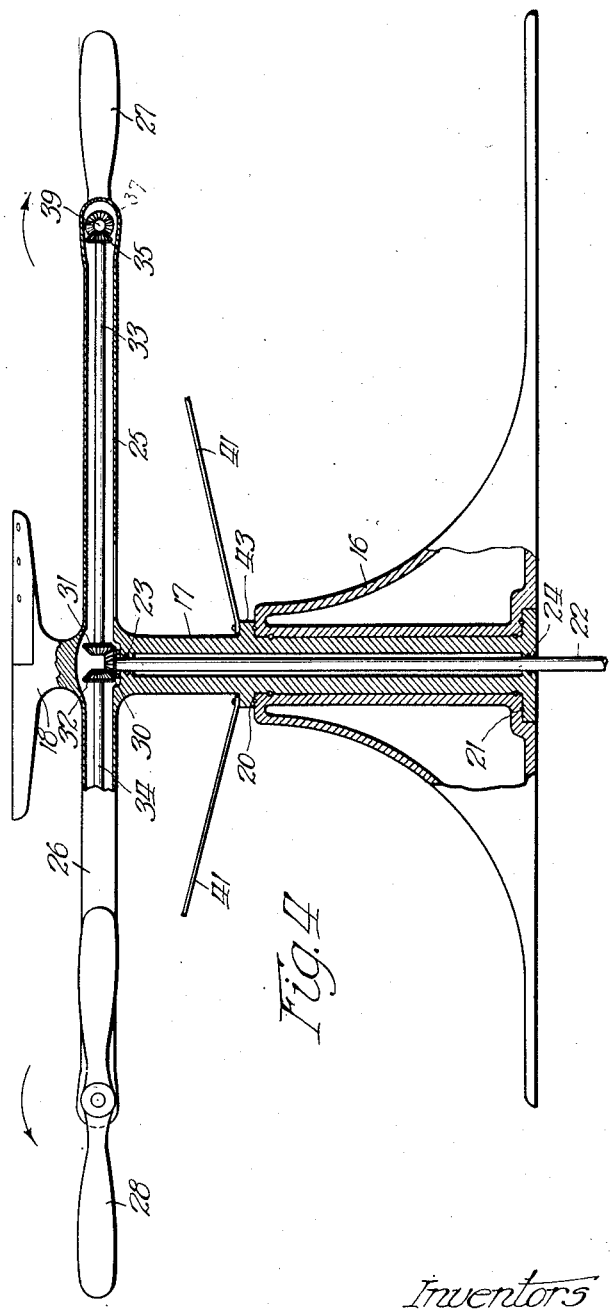

Patented Dec. 20, 1927.

1,653,185

UNITED STATES PATENT OFFICE.

FREDERICK C. KUSSE, SR., AND FREDERICK C. KUSSE, JR., OF CHICAGO, ILLINOIS.

AIRCRAFT.

Application filed February 5, 1927. Serial No. 166,259.

Our invention relates to aircraft structures and has for its principal object the provision of a machine of this character having a driving motor and the usual driving propeller for causing forward movement and in addition means for exerting a lifting force upon the body of the machine so as to raise it from the ground.

In the application of our invention the principal object is to obtain a distinct type of aircraft in which a car or body adapted to be driven forwardly by means of the usual propeller is further equipped with a lifting device which can accomplish vertical ascent of the body and which may permit vertical descent at any desired rate regardless of the forward movement of the machine.

It is the further purpose of our invention to provide a lifting device of this character which gives the aircraft automatic stability and which will eliminate the present dependence of aircraft upon their horizontal speed as a means of obtaining vertical ascent.

In the particular form of the invention shown, we accomplish the desired results by means of a plurality of propellers rotating about parallel axes which extend substantially horizontally when the body of the machine is in horizontal position. These propellers are used to rotate a lifting vane or vanes which under the influence of the propellers may exert any desired lifting force depending upon the speed of rotation and the construction of the propellers. However, we wish it to be distinctly understood that we do not intend to limit ourselves to the exact details shown and described, but that we intend to avail ourselves of all such modifications as would occur to one skilled in this art and as fall within the scope of the claims.

In the drawings:

Fig. 1 is a side view showing our lifting device as attached to the aircraft body;

Fig. 2 is a plan view illustrating the rotating wings of our lifting device;

Fig. 3 is a horizontal sectional view illustrating the position of the propellers which drive the rotating lifting device; and Fig. 4 is a vertical section through our improved lifting device illustrating the driving mechanism.

Referring now in detail to the drawings, the numeral 10 indicates the aircraft body having the driving propeller 11 operated by means of the motor 12 in the usual manner. The body is equipped with the usual wheels 13 and a rudder 14 which may be of any well known type. In the aircraft of present use difficulty has always been encountered in getting the machine off the ground without attaining considerable speed and thereby necessitating the provision of large take-off and landing fields. To overcome this difficulty, we provide in the particular form shown, a rotating device 15 mounted on top the body by means of the pedestal 16 which may form a part of the roof of the body. This pedestal 16 supports a rotatable shaft 17 which has a hub 18 thereon carrying a plurality of wings 19, the shaft 17 being supported for free rotation upon the pedestal 16. Anti-friction bearings, such as ball-bearings illustrated at 20 and 21 are used between the shaft 17 and the pedestal 16.

In order to cause rotation of the lifting device, we provide a drive shaft 22 which may be connected by a suitable transmission to the motor operating the usual driving propeller. This drive shaft extends substantially vertically upward through the shaft 17 and is rotatably mounted therein by means of bearings 23 and 24 so that the shaft 17 forms a support and bearing for the upper end of the shaft 22. Below the hub 18 and extending outwardly from the shaft 17 in diametrically opposite directions are the hollow arms 25 and 26 which support at their outer ends propellers 27 and 28. Upon an examination of Figs. 2 and 4, it will be noted that the propellers 27 and 28 are so arranged that they rotate in a plane including the axis of the shaft 22. These propellers are driven by means of the shaft 22 through the gear 30 at the upper end thereof engaging gears 31 and 32 upon horizontal shafts 33 and 34 housed in the arms 25 and 26, respectively. These shafts 33 and 34 have gears 35 and 36 at their outer ends meshing with the gears 37 and 38 on the stub shafts 39 and 40 mounted in the ends of the arms 25 and 26 and carrying the propellers 27 and 28. Thus it will be seen that the propellers 27 and 28 are directly driven from the driving motor of the machine by means of the shaft and gear structure described, the direction of rotation of one propeller being opposite to that of the other when viewed from the side as shown in Fig. 4.

These propellers are so constructed as to draw the air through them in the directions illustrated by the arrows in Fig. 3. This causes a torque on the arms 25 and 26 tending to rotate the shaft 17 upon the pedestal 16 and with it of course, the wings 19 of the lifting device. By this structure and by the construction of the rotating wings 19 at the proper pitch sloping downward in a direction opposite to that of the direction of rotation, there is set up a lifting force along the axis of the shaft 17 tending to cause the machine to rise vertically upward. The wings 19 may be braced as by means of the brace rods 41, 42 connecting the outer portion of the wings to the shaft 17 at the flange 43 and may be additionally braced at certain points as by means of the rods 44 and 45 connected to the arms 25 and 26 which extend outwardly from the shaft member 17.

From the above description it is thought that the operation of the device will be clear. It will be noted that we have provided a strong stable structure which may be mounted upon the body of the aircraft and connected to any suitable driving mechanism therein, either to the usual driving motor for the forward propeller or other driving means so as to exert at any time a direct lifting force upwardly on the body.

While the device as shown does not have wings as in the usual aeroplane, it is obvious that our lifting device may be mounted upon the body of the usual aeroplane so that it may exert at any time desired an additional lifting force over that which may be obtained by the usual equipment of the aeroplane and which may, when the desired elevation has been obtained, be stopped so as to permit the operation of the aeroplane in the usual manner.

Having thus described our invention, what we claim as new and desire to secure by United States Letters Patent is:—

1. A lifting device for aircraft comprising a rotatable lifting vane, a support therefor rotatably mounted on the aircraft body and means for rotating said vane and support comprising a propeller carried by said support rotatable in a plane including the axis of rotation of said vane, and means for rotating said propeller.

2. A lifting device for aircraft comprising a rotatable lifting vane, a support therefor rotatably mounted on the aircraft body and means for rotating said vane and support comprising a plurality of oppositely disposed propellers carried by said support each rotatable in a plane including the axis of said vane and means for rotating said propellers.

3. A device of the character described for exerting a lifting force upon an aeroplane comprising a rotatable vane, a hollow supporting shaft for said vane rotatably secured to the body of the aeroplane, a hollow arm extending laterally from said supporting shaft in front of said vane and carrying a propeller adjacent its outer end adapted to force air against the lower surface of said vane, and a driving connection for said propeller extending through said hollow shaft and arm.

4. A device of the character described for exerting a lifting force upon an aircraft body comprising a rotatable vane, a hollow supporting shaft for said vane rotatably secured to said body, a plurality of hollow arms extending laterally from said shaft, a propeller rotatably supported by each arm and means extending through said hollow shaft and arms for rotating said propellers, said propellers rotating in a common plane but facing in opposite directions.

5. A device of the character described for exerting a lifting force upon an aircraft body comprising a rotatable vane, a hollow supporting shaft for said vane rotatably secured to said body, a plurality of hollow arms extending laterally from said shaft, a propeller rotatably supported by each arm and means extending through said hollow shaft and arms for rotating said propellers, said propellers each rotating in a plane including the axis of rotation of said vane.

6. In an aircraft structure, a rotating member having a plurality of blades curved rearwardly from the advancing edges thereof and propellers mounted in front of said blades and each rotating substantially in a plane including the axis of rotation of said rotating member to direct air against the inner curved surfaces of said blades, and means for rotating said propellers.

In witness whereof, we hereunto subscribe our names this 19th day of January A. D. 1927.

FREDERICK C. KUSSE, Sr.
FREDERICK C. KUSSE, Jr.